(12) United States Patent
Saxena et al.

(10) Patent No.: US 12,401,265 B2
(45) Date of Patent: Aug. 26, 2025

(54) METHODS AND SYSTEMS FOR IMPLEMENTING A FREQUENCY HOPPING SCHEME IN A SWITCHING REGULATOR

(71) Applicant: SAMSUNG ELECTRONICS CO., LTD., Suwon-si (KR)

(72) Inventors: Saurabh Saxena, Karnataka (IN); E Chinmaya Kiran Murty, Karnataka (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 350 days.

(21) Appl. No.: 18/120,460

(22) Filed: Mar. 13, 2023

(65) Prior Publication Data

US 2023/0291298 A1    Sep. 14, 2023

(30) Foreign Application Priority Data

Mar. 14, 2022  (IN) .............. 202241013864

(51) Int. Cl.
*H02M 3/04* (2006.01)
*H02M 1/00* (2006.01)

(52) U.S. Cl.
CPC ....... *H02M 1/0048* (2021.05); *H02M 1/0012* (2021.05); *H02M 3/04* (2013.01)

(58) Field of Classification Search
CPC ... H02M 1/0048; H02M 1/0012; H02M 2/304
See application file for complete search history.

(56) References Cited

U.S. PATENT DOCUMENTS

| | | | |
|---|---|---|---|
| 7,528,590 B2 | 5/2009 | Wei | |
| 9,325,243 B2* | 4/2016 | Jayaraj | ............... H02M 3/1588 |
| 9,455,626 B2* | 9/2016 | Xue | .................... H02M 3/156 |
| 10,122,278 B1 | 11/2018 | Xue et al. | |
| 10,250,118 B1* | 4/2019 | Wang | .................... H02M 3/156 |
| 11,005,368 B2* | 5/2021 | Bansal | .................... H03F 3/245 |
| 2013/0049711 A1 | 2/2013 | Mirea | |
| 2016/0322896 A1 | 11/2016 | Davis | |
| 2019/0222109 A1 | 7/2019 | Gambetta et al. | |

* cited by examiner

*Primary Examiner* — Adolf D Berhane
(74) *Attorney, Agent, or Firm* — MORGAN, LEWIS & BOCKIUS LLP

(57) ABSTRACT

A method for controlling the switching frequency of a switching regulator operating in a pulse skip mode, the method including: altering, by a digital logic block, a magnitude of a hysteresis voltage with a load current and an output ripple voltage of the switching regulator; and controlling, by a comparator, an average pulse skip mode frequency of the switching regulator, using the magnitude of the altered hysteresis voltage.

20 Claims, 10 Drawing Sheets

PSK Comparator Hysteresis Voltage Vs Frequency

| Load/Hyst | 0mV | 2.5mV | 5mV | 7.5mV | 10mV |
|---|---|---|---|---|---|
| 1.00mA | 4.91E+04 | 2.59E+04 | 1.36E+04 | 1.05E+04 | 7.46E+03 |
| 2.00mA | 9.72E+04 | 5.17E+04 | 2.68E+04 | 2.11E+04 | 1.53E+04 |
| 3.00mA | 1.42E+05 | 7.50E+04 | 4.05E+04 | 2.68E+04 | 2.38E+04 |
| 4.00mA | 1.95E+05 | 1.07E+05 | 5.56E+04 | 3.75E+04 | 2.83E+04 |

PSK Comparator Hysteresis Voltage Vs Output Ripple

| Load/Hyst | 0mV | 2.5mV | 5mV | 7.5mV | 10mV |
|---|---|---|---|---|---|
| 1.00mA | 1.76E-03 | 2.93E-03 | 5.96E-03 | 7.63E-03 | 1.06E-02 |
| 2.00mA | 1.39E-03 | 2.82E-03 | 5.82E-03 | 7.35E-03 | 1.04E-02 |
| 3.00mA | 1.82-e3 | 2.85E-03 | 5.74E-03 | 9.20E-03 | 1.00E-02 |
| 4.00mA | 1.71E-03 | 2.65E-03 | 5.49E-03 | 8.41E-03 | 1.14E-02 |

FIG. 10

| Converter in PSM Mode | | Traditional System 100 | Example Embodiment System 200 |
|---|---|---|---|
| Parameter | Unit | Value | Value |
| Vout | V | 4.2 | 4.2 |
| Vin | V | 6.5 | 6.5 |
| Iload | A | 10m | 10m |
| Loss Component | Unit | Value | |
| Ploss_HS | W | 1.253E-04 | 1.253E-04 |
| Ploss_LS | W | 1.411E-04 | 1.411E-04 |
| Ploss_LX_DCR | W | 2.542E-04 | 2.542E-04 |
| Psw PowerFET Cj | W | 7.365E-03 | 3.682E-03 |
| Psw CBTS | W | 4.594E-03 | 2.297E-03 |
| Pdiode | W | 1.589E-04 | 1.589E-04 |
| IQ loss | W | 2.432E-03 | 1.900E-03 |
| Total Losses | W | 1.507E-02 | 8.558E-03 |
| Efficiency | % | 74.8% | 85.62% |

Conduction Loss: Ploss_HS, Ploss_LS, Ploss_LX_DCR
Switching Loss: Psw PowerFET Cj, Psw CBTS
Conduction Loss: Pdiode, IQ loss

METHODS AND SYSTEMS FOR IMPLEMENTING A FREQUENCY HOPPING SCHEME IN A SWITCHING REGULATOR

CROSS-REFERENCE TO RELATED APPLICATION

This application claims priority under 35 U.S.C. § 119 to Indian Patent Application No. 202241013864 filed on Mar. 14, 2022, the disclosure of which is incorporated by reference herein in its entirety.

TECHNICAL FIELD

Embodiments of the inventive concept disclosed herein relate to switching regulators, and more particularly to implementing a frequency hopping scheme in switching regulators.

DISCUSSION OF RELATED ART

Switching regulators (also known as switching converters) are direct current (DC)-DC converters that convert an input DC voltage to a higher DC voltage or a lower DC voltage, as required by a load. In other words, the switching regulator can convert an input DC voltage to a desired DC voltage. In the case of a lower load, the switching regulator can experience significant switching loss. To reduce the switching loss and improve the efficiency of the switching regulator at lower loads, the switching regulator may operate in a pulse skip mode (PSM), instead of a pulse width mode (PWM).

In a traditional system 100 for implementing a frequency hopping scheme, as shown in FIG. 1, an error amplifier 101 can receive as inputs a reference voltage, $V_{REF}$, and a feedback node voltage, $V_{FB}$. The output of the error amplifier, EAO, can be the difference between the reference voltage $V_{REF}$ and the feedback voltage $V_{FB}$. The output EAO can then be compared with a derived reference voltage, PSK_REF, using a comparator 103a. When the output EAO is lesser than the derived reference voltage PSK_REF, the pulse skip mode (PSK/PSM) is enabled, e.g., PSK_EN.

Upon enabling the PSK, the PSK frequency can be changed by altering a peak inductor current limit (I_Peak). By introducing an offset I_Offset, through a mixer 105, in a comparison, performed by a comparator 103b, of the output of the mixer 105 along with the inductor current, the peak inductor current may be altered. Accordingly, an output of the comparator 103b is generated resulting in low side switch control, e.g., NSW, or high side switch control, e.g., PSW.

In a switching regulator integrated circuit (IC), certain frequency bands can cause interference, for example, electromagnetic interference, and this can effect the overall noise performance of the IC. A switching regulator IC's specification may identify certain forbidden frequency bands that can adversely effect the noise performance of the switching regulator IC. For optimal performance, the frequency of the switching regulators, operating in the pulse skip mode, should be kept outside of the forbidden frequency bands. In addition, control of the output ripple voltage of the switching regulator can lead to better performance.

SUMMARY

According to an example embodiment of the inventive concept, there is provided a method for controlling the switching frequency of a switching regulator operating in a pulse skip mode, the method including: altering, by a digital logic block, a magnitude of a hysteresis voltage with a load current and an output ripple voltage of the switching regulator; and controlling, by a comparator, an average pulse skip mode frequency of the switching regulator, using the magnitude of the altered hysteresis voltage.

According to an example embodiment of the inventive concept, there is provided a system including: a comparator, wherein the comparator compares a feedback node voltage and a derived reference voltage using a magnitude of a hysteresis voltage to output a signal to enable a pulse skip mode in a switching regulator; a frequency block, wherein the frequency block senses an average pulse skip mode frequency of the switching regulator; and a digital logic block, wherein the digital logic block controls the magnitude of the hysteresis voltage based on the sensed average pulse skip mode frequency and a load current.

According to an example embodiment of the inventive concept, there is provided a system including: a comparison circuit, wherein the comparison circuit compares a feedback node voltage and a derived reference voltage to enable a pulse skip mode in a switching regulator; a frequency circuit, wherein the frequency circuit senses an average pulse skip mode frequency of the switching regulator; and a digital logic circuit, wherein the digital logic circuit increases or decreases a magnitude of a hysteresis voltage to keep the pulse skip mode frequency outside of a predetermined frequency band based on the sensed average pulse skip mode frequency and a load current.

Example embodiments set forth herein disclose systems and methods for a frequency hopping scheme in a switching regulator maintains the frequency of the switching regulator outside of a forbidden frequency band of the switching regulator.

These and other features of the inventive concept disclosed herein will be better appreciated and understood when considered in conjunction with the following detailed description and the accompanying drawings. It should be understood, however, that the following descriptions, while indicating example embodiments and numerous specific details thereof, are given by way of illustration and not of limitation. Many changes and modifications may be made within the scope of the example embodiments described herein, and the example embodiments herein are intended to include all such modifications.

BRIEF DESCRIPTION OF THE FIGURES

In the accompanying drawings, like reference letters indicate corresponding parts in the various figures. The embodiments disclosed herein will be better understood from the following detailed description with reference to the drawings, in which:

FIG. 10 illustrates tabular data of power loss and efficiency of the system for an example load current of 10 mA, according to example embodiments of the inventive concept.

DETAILED DESCRIPTION OF THE EMBODIMENTS

Figure 1:
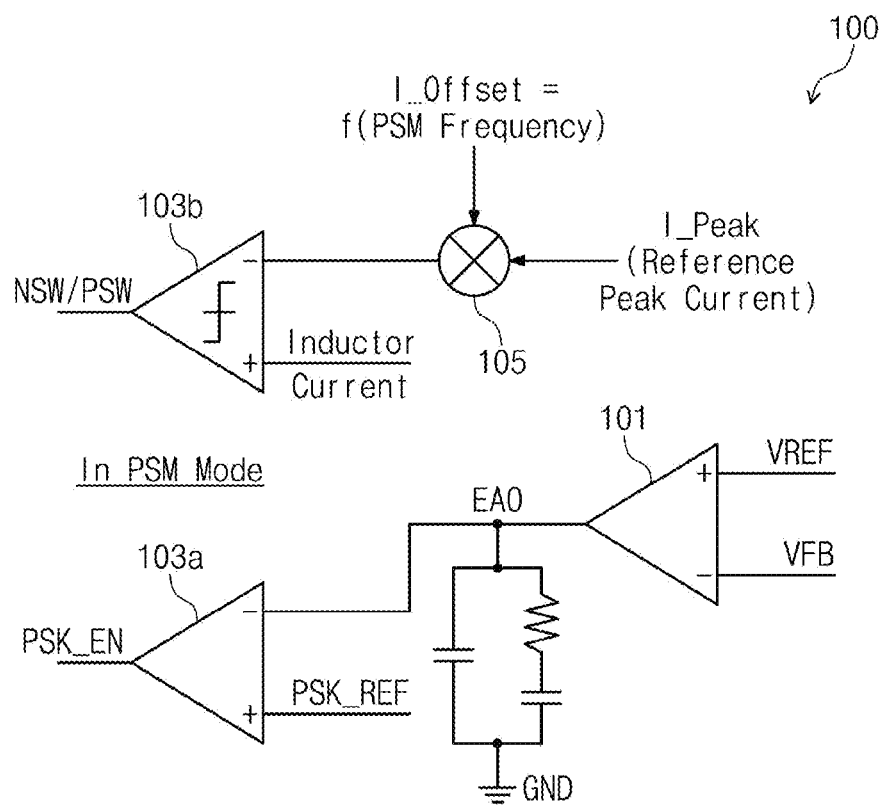
FIG. 1 illustrates a traditional system for implementing a frequency hopping scheme in a switching regulator, according to the prior art.

The embodiments disclosed herein relate to systems and methods for implementing a frequency hopping scheme in a switching regulator, thereby controlling and maintaining the pulse skip mode frequency of the switching regulator, such that the pulse skip mode frequency remains outside of the switching regulator's forbidden frequency band(s). In other words, in an embodiment of the inventive concept, the pulse skip mode frequency may be kept outside of frequency bands that can adversely effect the noise performance of the switching regulator. A feature of the system according to an example embodiment of the inventive concept is that it can improve the efficiency of the switching regulator for low loads, and can allow for better control over the output voltage ripple. Examples of the switching regulators that can be a part of the system are buck, buck boost, and boost mode switching regulators, etc. In the switching regulator according to an example embodiment of the inventive concept, a pulse skip mode (PSM) can be enabled if the feedback node voltage is lower than the reference voltage or a derived reference voltage. When the PSM is enabled, an error amplifier can be bypassed from a regulator loop and pulses can be skipped. In the charging phase of the switching regulator, a burst of switching pulses with a defined duty cycle can be used. Once the load current is within the range of current for PSM operation, the error amplifier can be disabled; however, the output voltage can still be regulated. This can save power and improve the low load efficiency of the switching regulator. Embodiments of the systems and methods disclosed herein can enable selective frequency hopping with seamless integration in traditional PSM architecture and as a result provide control over the output ripple voltage.

Referring now to the drawings, and more particularly to FIGS. 2 through 10, where similar reference characters denote corresponding features throughout the figures, there are shown embodiments of the inventive concept.

Figure 2:
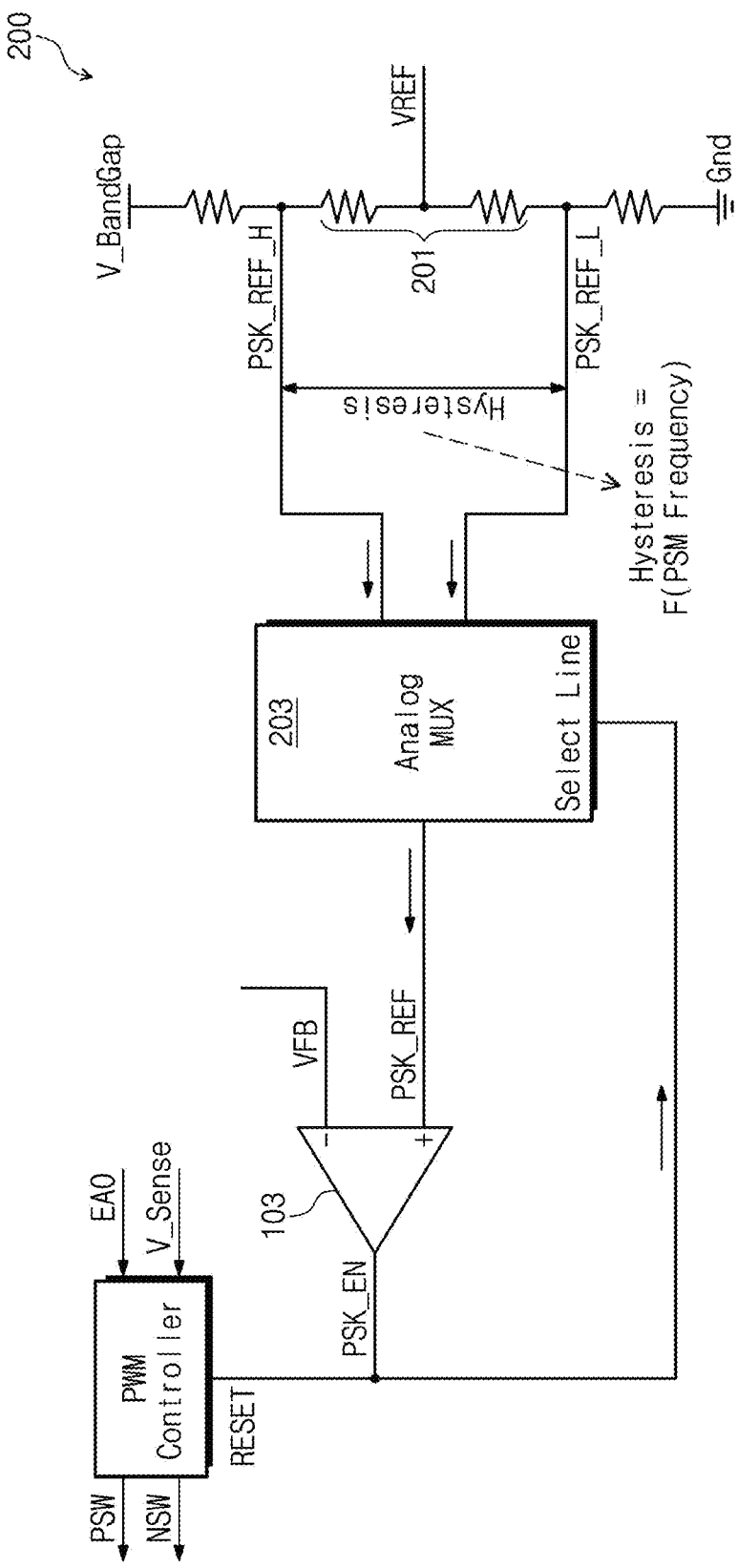
FIG. 2 illustrates a system for implementing a frequency hopping scheme in a switching regulator, according to example embodiments of the inventive concept.

FIG. 2 illustrates the system 200 for implementing the frequency hopping scheme in a switching regulator, according to example embodiments of the inventive concept. A reference voltage, $V_{REF}$, can be divided by a voltage divider circuit 201, through which a programmable hysteresis voltage can be applied to obtain a high derived reference voltage, PSK_REF H, and a low derived reference voltage, PSK_REF L. The voltage divider circuit 201 may include a plurality of resistors connected in series between a bandgap voltage V_BandGap and a ground GND.

An analog multiplexer 203 can output a derived reference voltage, PSK_REF, which can be one of the high derived reference voltage PSK_REF H or the low derived reference voltage PSK_REF L, to the positive input of a comparator 103. A feedback node voltage, $V_{FB}$, can be directed to the negative input of the comparator 103. The comparator 103 can compare the feedback node voltage $V_{FB}$ and the derived reference voltage PSK_REF, and can accordingly enable a pulse skip mode if the feedback node voltage $V_{FB}$ is lower than the derived reference voltage PSK_REF. The pulse skip mode may be enabled by a pulse skip mode enable signal PSK_EN output from the comparator 103. The pulse skip mode enable signal PSK_EN may be provided to a PWM controller as a reset signal. The PWM controller may also receive EAO and V_Sense signals as input and output signals NSW and PSW.

The following formulas are applicable for determining the hysteresis voltage to be introduced to the system 200:

$$V_{FB} = \beta * V_{OUT}$$

$$= \beta * \left(V_{AOUT} \pm \frac{\Delta V_{OUT}}{2}\right)$$

$$\text{PSK\_REF} = \left(V_{REF} \pm \frac{V_{HYST}}{2}\right)$$

where, $V_{FB}$ is the feedback node voltage, $\beta$ is the feedback factor, $V_{OUT}$ is the output voltage, $V_{AOUT}$ is the average output voltage, $\Delta V_{OUT}$ is the ripple in the output voltage, PSK_REF is the derived reference voltage, $V_{REF}$ is the reference voltage, and $V_{HYST}$ is the hysteresis voltage to be introduced in the comparison between the feedback node voltage $V_{FB}$ and the derived reference voltage PSK_REF.

At the comparator 103 trip point, in a steady state:

$V_{FB}$=PSK_REF, therefore $$V_{HYST} = \beta * \nabla V_{OUT}$$

When both switches are off (in PSK mode) and the output capacitance, $C_{OUT}$, is discharging through the resistive load, $$\Delta V_{OUT} \times (C_{OUT}/I_{LOAD}) = T_{OFF}$$

$$I_{LOAD} = \frac{V_{OUT}}{R_{LOAD}}$$

where $I_{LOAD}$ is the current through the load, $T_{OFF}$ is the time period during which the switches are off, and $R_{LOAD}$ is the resistance of the load.

The switching period, $T_{SW}$, can be determined by the following formula.

$$T_{SW} = \frac{1}{F_{SW}} = T_{ON} + T_{OFF}$$

In PSM, $T_{ON} \ll T_{OFF}$, therefore, $$F_{SW} \sim \frac{1}{T_{OFF}}$$

where $T_{ON}$ is the time during which the switches are on, and $F_{SW}$ is the frequency of the switching period.

Once PSM is enabled, an altered hysteresis voltage can then be introduced during the comparison between the feedback node voltage $V_{FB}$ and the derived reference voltage PSK_REF. Due to the introduction of this altered hysteresis voltage, the PSM frequency may change. Based on the load current, the hysteresis voltage can be varied to obtain the desired pulse skip mode frequency. As such, the PSM frequency of the switching regulator can be controlled to remain outside of its forbidden frequency bands. The hysteresis voltage can also be altered to conform the output ripple voltage of the switching regulator to that permitted by the specification of the switching regulator.

Figure 3:
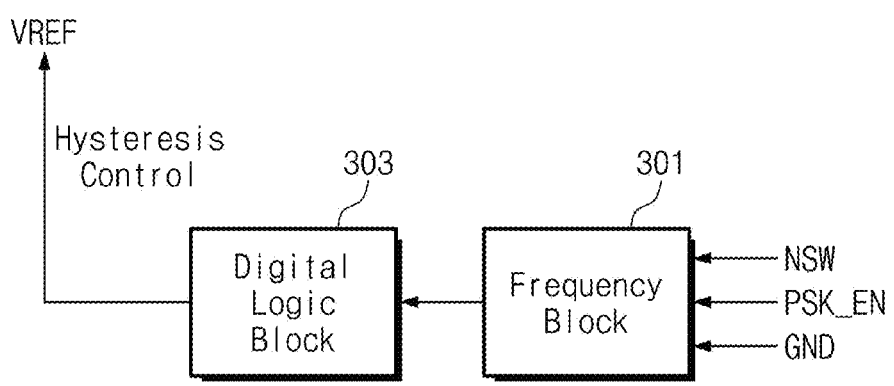
FIG. 3 illustrates the implementation of hysteresis control in the system of FIG. 2.

FIG. 3 illustrates the implementation of hysteresis control in the system 200, according to example embodiments of the inventive concept. As shown in FIG. 3, a frequency block 301 can receive a low side switch control (NSW) and an output signal (PSK_EN) from the comparator 103. Initially, when PSM is not enabled, the hysteresis voltage applied to the derived reference voltage PSK_REF, can have a fixed magnitude that can be controlled by a digital logic block 303.

When PSM is enabled, the frequency block 301 can sense the average PSM frequency of the switching regulator. The frequency block 301 can count the number of switching events on the low side switch control signal NSW in a fixed time. As such, the frequency of the switching regulator may be the frequency of the low side switch control signal NSW. Based on this information, the frequency block 301, along with the digital logic lock 303, can determine whether the PSM frequency of the switching regulator is outside of the forbidden frequency band(s). The digital logic block 303 can provide an output signal to indicate whether the output ripple voltage of the switching regulator is in accordance with the specification of the switching regulator. The frequency block 301 can have a calibration option to improve accuracy over the load current sensed.

If the PSM frequency is within a forbidden frequency band, then the PSM frequency can be modified to remain outside of the forbidden frequency band. The digital logic block 303 can modify the PSM frequency by altering/varying the hysteresis voltage applied to the derived reference voltage PSK_REF. The digital logic block 303 may receive from the frequency block 301 information regarding the sensed average PSM frequency. Accordingly, the digital logic block 303 may alter the hysteresis by either increasing or decreasing the hysteresis voltage that is applied. This altered hysteresis voltage can then be introduced in the comparison, by the comparator 103, between the feedback node voltage $V_{FB}$ and the derived reference voltage PSK_REF, to enable the PSM frequency to escape the forbidden frequency bands. The digital logic block 303 may have a digital-to-analog converter that may receive the digital input from the frequency block 301 and provide an analog output of the hysteresis voltage that is to be applied. It is to be noted that example embodiments of the inventive concept are not limited to using a frequency block 301 and a digital logic block 303 for sensing the PSM frequency and controlling hysteresis voltage, respectively, and as such may include other circuits for performing those same functions.

Figure 4A:
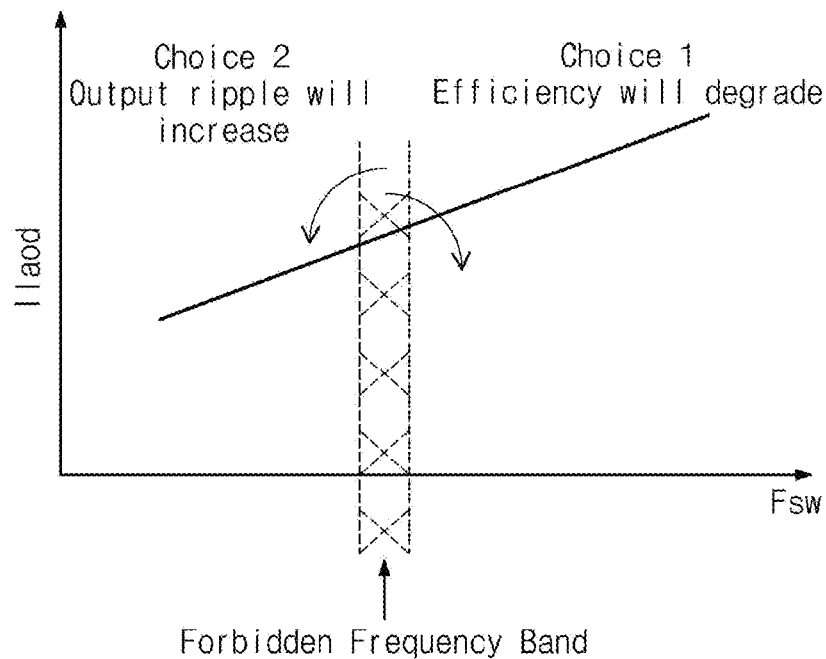
FIG. 4a is a graphical representation of a load current versus a switching frequency, according to example embodiments of the inventive concept.

FIG. 4a is a graphical representation of the load current versus the switching frequency, according to example embodiments of the inventive concept. The load current (Iload) and the switching frequency ($F_{SW}$) can have a linear relationship. When the switching frequency $F_{SW}$ falls within a forbidden frequency band, the hysteresis voltage is increased to reduce the switching frequency $F_{SW}$ and have the switching frequency $F_{SW}$ exit from the forbidden frequency band (see Choice 2). Increasing the hysteresis voltage can also increase the output ripple voltage. Alternatively, the hysteresis voltage may be lowered, which can increase the switching frequency $F_{SW}$ and result in the switching frequency $F_{SW}$ exiting the forbidden frequency band, however, this alternative method may cause the efficiency of the switching regulator to decrease (see Choice 1).

Figure 4B:
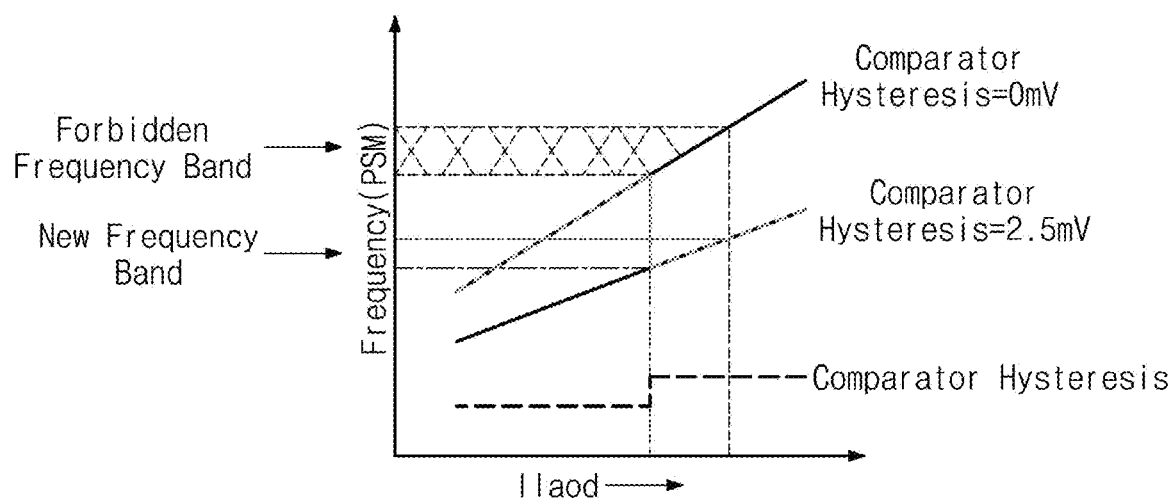
FIG. 4b is a graphical representation of a pulse skip mode frequency versus a load current, according to example embodiments of the inventive concept.

FIG. 4b is a graphical representation of the pulse skip mode frequency (Frequency (PSM)) versus the load current (Iload), according to example embodiments of the inventive concept. It can be seen from FIG. 4b that the PSM frequency varies depending on the comparator 103 hysteresis voltage and load current. The hysteresis voltage can be altered such that the frequency hopping is done to allow the PSM frequency to avoid the forbidden frequency band. FIG. 4b shows examples of comparator hysteresis at 0 mV and 2.5 mV.

Figures 5A, 5B:
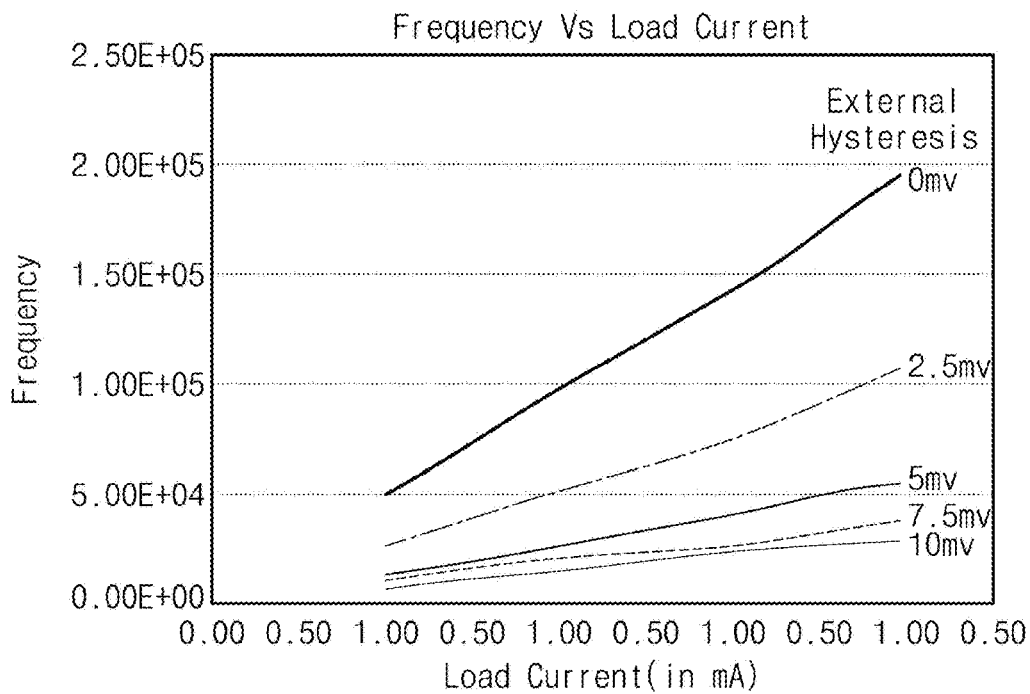
FIG. 5a is a graphical representation of simulation results of a pulse skip mode frequency as a function of a load current and a hysteresis voltage, according to example embodiments of the inventive concept.
FIG. 5b is a tabular representation of simulation results of a comparator hysteresis voltage versus a pulse skip mode frequency and an output ripple voltage, according to example embodiments of the inventive concept.

FIG. 5a is a graphical representation of the simulation results of the pulse skip mode frequency as a function of the load current and the hysteresis voltage, according to example embodiments of the inventive concept. FIG. 5b is a tabular representation of the simulation results of the comparator hysteresis voltage versus frequency and output ripple voltage, according to example embodiments of the inventive concept. The following can be deduced from FIGS. 5a and 5b. As the load current increases for a fixed magnitude of hysteresis voltage, the PSM frequency increases. Similarly, for a fixed value of the load current, as the hysteresis voltage increases, the PSM frequency decreases. Accordingly, by altering the hysteresis voltage, a desired PSM frequency can be obtained, where the desired PSM frequency is outside of the forbidden frequency band of the switching regulator. It can also be deduced from the table in FIG. 5b that the values for the hysteresis voltage and the output ripple voltage can have a ratio around 1:1, e.g., $V_{HYST} = \beta * \Delta V_{OUT}$.

Figure 6:
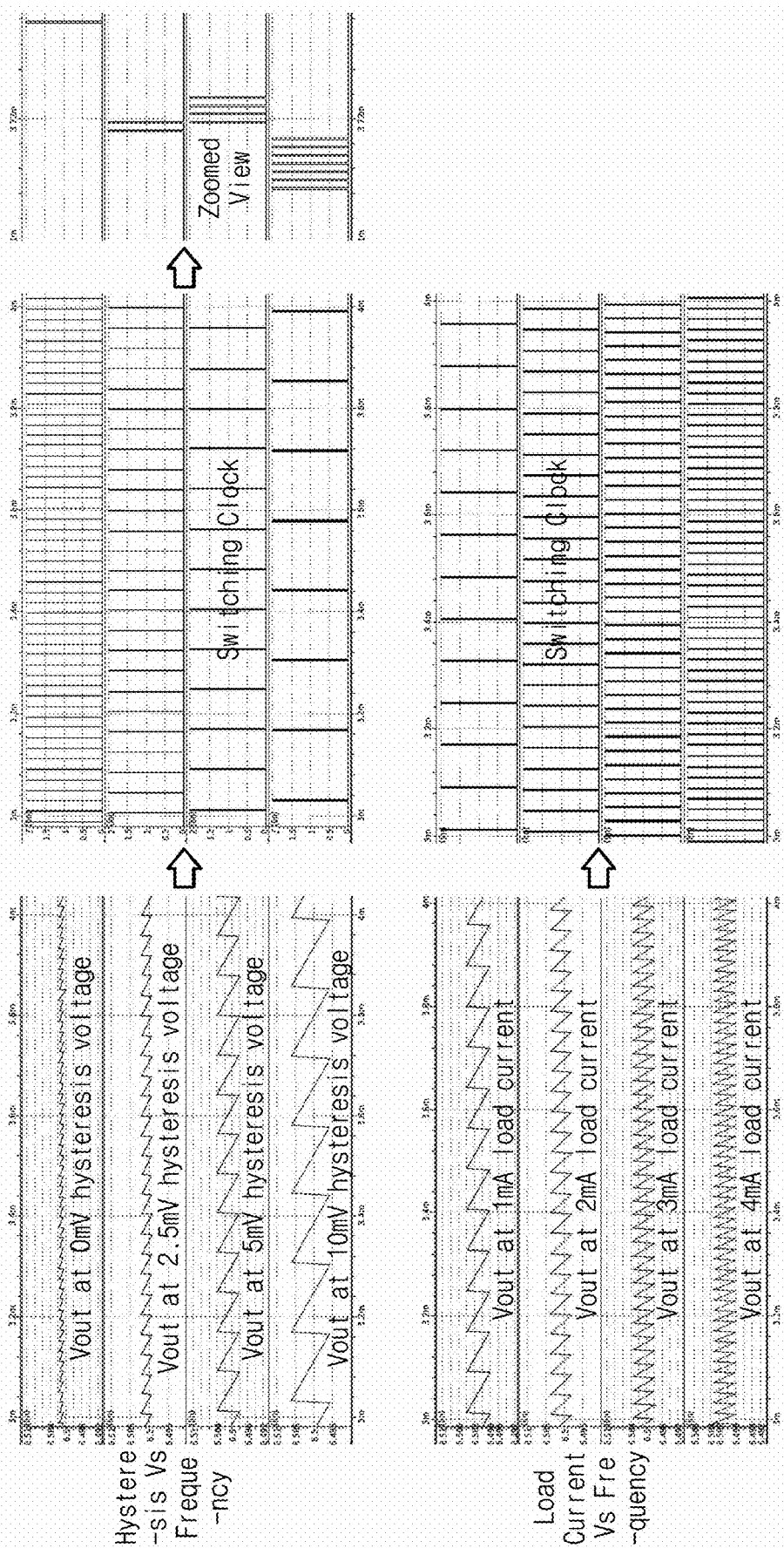
FIG. 6 illustrates a graphical representation of simulation results of a hysteresis voltage versus a pulse skip mode frequency and a load current versus pulse skip mode frequency, according to example embodiments of the inventive concept.

FIG. 6 illustrates a graphical representation of the simulation results of the hysteresis voltage versus PSM frequency and load current versus PSM frequency, according to example embodiments of the inventive concept. It can be seen from the hysteresis voltage versus PSM frequency graph that as the hysteresis voltage increases, the PSM frequency decreases. As the hysteresis voltage increases, so does the number of the charging pulses. It can also be seen from the load current versus PSM frequency graph of FIG. 6 that as the load current increases, the PSM frequency increases.

Figure 7:
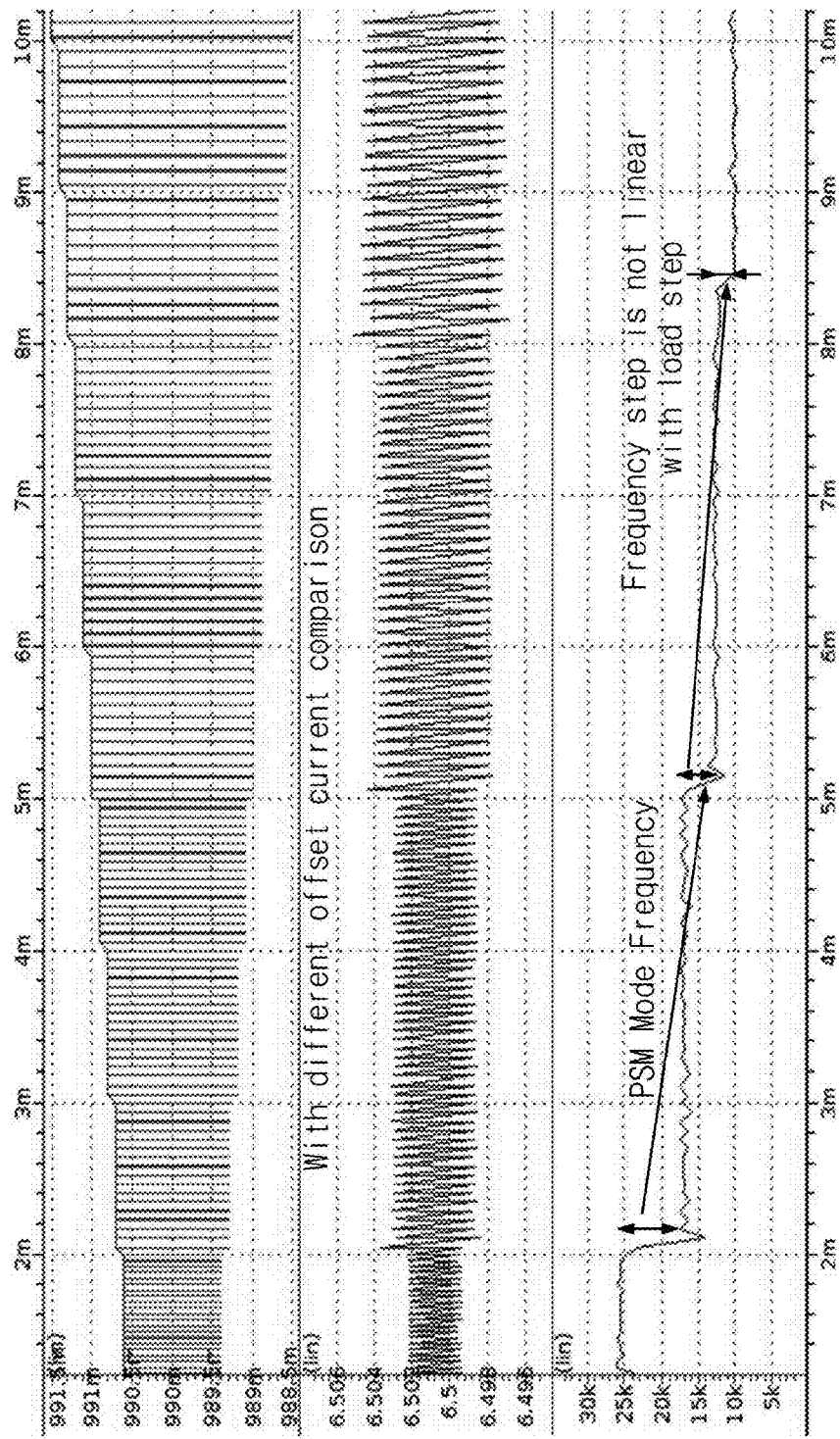
FIG. 7 illustrates simulation results of an output voltage waveform with a different offset in peak current comparison for a fixed load current, in the traditional system for implementing the frequency hopping scheme.

FIG. 7 illustrates the simulation results of an output voltage waveform with a different offset in peak current comparison for a fixed load current, in a traditional system 100 for implementing the frequency hopping scheme. It can be seen from FIG. 7 that the PSM frequency varies in a non-linear manner with a different offset current in a peak current control mode, unlike in the system 200 according to example embodiments of the inventive concept where the PSM frequency and load current have a linear relationship.

Figure 8:
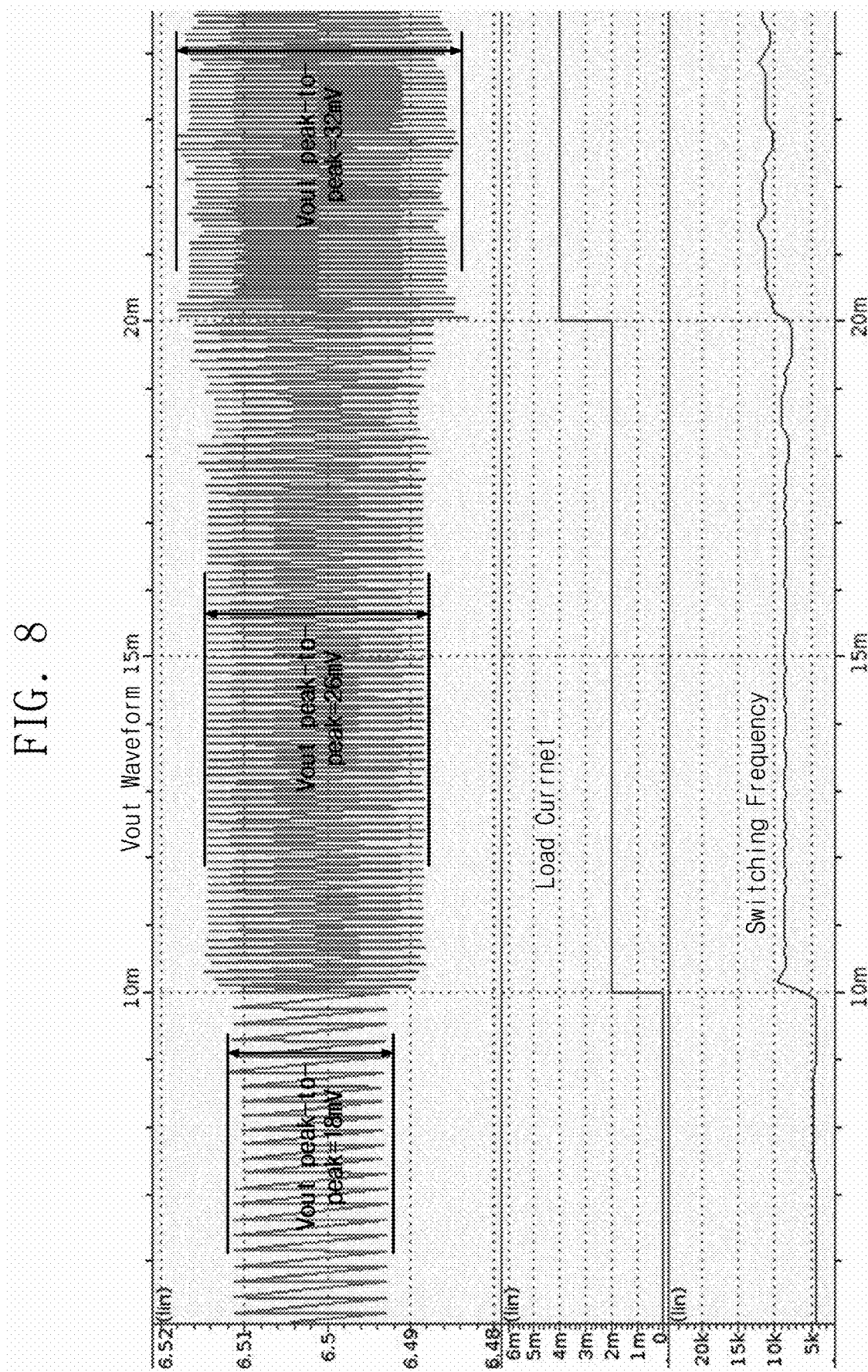
FIG. 8 illustrates simulation results of an output voltage waveform with a varying load current for a fixed offset in current comparison, in the traditional system for implementing the frequency hopping scheme.

FIG. 8 illustrates the simulation results of an output voltage waveform with a varying load current for a fixed offset in current comparison, in the traditional system 100 for implementing the frequency hopping scheme. It can be seen from FIG. 8 that the output ripple voltage and the switching frequency vary with the load current. At different switching frequencies, the control loop experiences a different gain for correction which can cause a variable frequency of operation. This introduces an additional variability source for the output ripple voltage, which is undesirable. Due to the EAO being a slow node, the amount of control over the output ripple voltage in the traditional system 100 is lesser compared to the system 200 according to example embodiments of the inventive concept.

Figure 9:
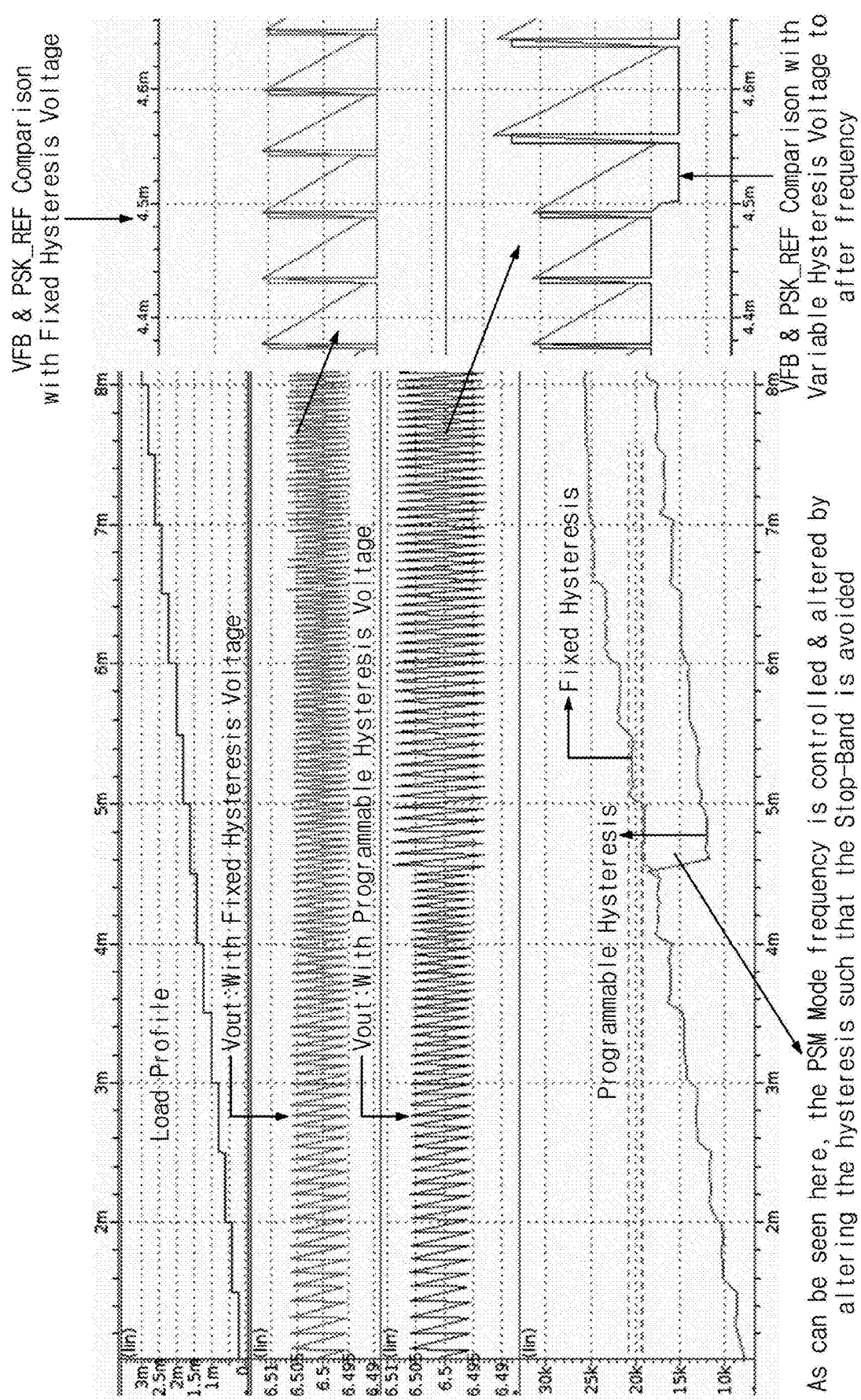
FIG. 9 illustrates the simulation results of the system with a fixed hysteresis voltage and a variable hysteresis voltage, according to example embodiments of the inventive concept.

FIG. 9 illustrates the simulation results of the system 200 with a fixed hysteresis voltage and a variable hysteresis voltage, according to example embodiments of the inventive concept. It can be seen from the frequency versus time graph, that for a fixed hysteresis voltage, the PSM frequency can continue to increase over time such that there is a linear relationship. For a variable hysteresis voltage, the PSM frequency can increase up to a value nearing the forbidden frequency band, and then decrease from there to avoid the forbidden frequency band. It is to be noted that the terms forbidden frequency band and stop-band are used interchangeably in this specification to refer to the range of frequencies at which the switching regulator experiences various interferences.

FIG. 10 illustrates the tabular data of the power loss and efficiency of the system for a load current of 10 mA, according to example embodiments of the inventive concept. It can be seen from FIG. 10 that with the same parameter values, the system 200 has a lower switching loss and conduction loss compared to the traditional system 100. For example, for the Loss Component $P_{SW}$ CBTS, the traditional system 100 has a value 4.594E-03, and the system 200 has a value 2.297E-03, and for the Loss Component IQ Loss, the traditional system 100 has a value 2.432E-03 and the system 200 has a value 1.900E-03.

It is to be noted that the abbreviations 'PSK' and 'PSM' are used interchangeably in this specification to refer to pulse skip mode. It is to be noted that the terms 'hysteresis voltage' and 'comparator hysteresis voltage' are also used interchangeably in this specification.

We claim:

1. A method for controlling the switching frequency of a switching regulator operating in a pulse skip mode, comprising:
    altering, by a digital logic block, a magnitude of a hysteresis voltage with a load current and an output ripple voltage of the switching regulator; and
    controlling, by a comparator, an average pulse skip mode frequency of the switching regulator, using the magnitude of the altered hysteresis voltage.

2. The method of claim 1, further comprising:
    comparing, by the comparator, a feedback node voltage and a derived reference voltage using the magnitude of the altered hysteresis voltage;
    outputting, by the comparator, a signal to enable a pulse skip mode if the feedback node voltage is lower than the derived reference voltage;
    sensing, by a frequency block, the average pulse skip mode frequency; and
    controlling, by the digital logic block, the magnitude of the hysteresis voltage, wherein the digital logic block controls the magnitude of the hysteresis voltage based on the sensed average pulse skip mode frequency.

3. The method of claim 1, wherein the switching regulator is a buck switching regulator, a buck boost switching regulator, or a boost mode switching regulator.

4. The method of claim 1, wherein the switching regulator comprises multiple forbidden frequency bands, wherein when the switching regulator is operated in one of the forbidden frequency bands, the switching regulator has degraded noise performance.

5. The method of claim 2, wherein the magnitude of the altered hysteresis voltage is altered to conform the output ripple voltage of the switching regulator to a specification of the switching regulator.

6. A system, comprising:
    a comparator, wherein the comparator compares a feedback node voltage and a derived reference voltage using a magnitude of a hysteresis voltage to output a signal to enable a pulse skip mode in a switching regulator;
    a frequency block, wherein the frequency block senses an average pulse skip mode frequency of the switching regulator; and
    a digital logic block, wherein the digital logic block controls the magnitude of the hysteresis voltage based on the sensed average pulse skip mode frequency and a load current.

7. The system of claim 6, further comprising an analog multiplexer, wherein the analog multiplexer outputs the derived reference voltage to the comparator.

8. The system of claim 6, wherein the comparator compares the feedback node voltage and the derived reference voltage using the magnitude of an altered hysteresis voltage that is output by the digital logic block.

9. The system of claim 8, wherein the magnitude of the altered hysteresis voltage is altered to conform an output ripple voltage of the switching regulator to the specification of the switching regulator.

10. The system of claim 6, wherein the switching regulator is a buck switching regulator, a buck boost switching regulator, or a boost mode switching regulator.

11. The system of claim 6, wherein the switching regulator comprises multiple forbidden frequency bands, wherein when the switching regulator is operated in one of the forbidden frequency bands, the switching regulator has degraded noise performance.

12. The system of claim 11, wherein the frequency block and the digital logic block are configured to determine whether the sensed average pulse skip mode frequency outside of the forbidden frequency bands.

13. The system of claim 12, wherein the digital logic block controls the magnitude of the hysteresis voltage to keep the sensed average pulse skip mode frequency outside of the forbidden frequency bands.

14. The system of claim 6, wherein the frequency block senses the average pulse skip mode frequency of the switching regulator by counting a number of switching events on a switch control signal.

15. The system of claim 6, wherein the digital logic block includes a digital to analog converter.

16. The system of claim 7, further comprising a voltage divider configured to provide one of a high derived reference voltage and a low derived reference voltage to be output by the analog multiplexer as the derived reference voltage.

17. The system of claim 16, wherein the analog multiplexer is provided with the signal to enable the pulse skip mode in the switching regulator as a selection signal.

18. The system of claim 6, wherein the pulse skip mode is enabled when the feedback node voltage is lower than the derived reference voltage.

19. The system of claim 18, wherein when the pulse skip mode is enabled, an error amplifier is bypassed from a regulator loop and pulses are skipped.

20. A system, comprising:
- a comparison circuit, wherein the comparison circuit compares a feedback node voltage and a derived reference voltage to enable a pulse skip mode in a switching regulator;
- a frequency circuit, wherein the frequency circuit senses an average pulse skip mode frequency of the switching regulator; and
- a digital logic circuit, wherein the digital logic circuit increases or decreases a magnitude of a hysteresis voltage to keep the pulse skip mode frequency outside of a predetermined frequency band based on the sensed average pulse skip mode frequency and a load current.

* * * * *